(12) United States Patent
Lee et al.

(10) Patent No.: US 8,333,932 B2
(45) Date of Patent: Dec. 18, 2012

(54) MICROARRAY HAVING BRIGHT FIDUCIAL MARK AND METHOD OF OBTAINING OPTICAL DATA FROM THE MICROARRAY

(75) Inventors: Kyu-sang Lee, Ulsan (KR); Seong-ho Cho, Gwacheon-si (KR); Carl S. Brown, Seattle, WA (US); Kyla Teplitz, Seattle, WA (US)

(73) Assignees: Samsung Electronics Co., Ltd., Samsung-ro, Yeongtong-gu, Suwon-si, Gyeonggi-do (KR); Applied Precision, Inc., Issaquah, WA (US)

( * ) Notice: Subject to any disclaimer, the term of this patent is extended or adjusted under 35 U.S.C. 154(b) by 196 days.

(21) Appl. No.: 12/704,163

(22) Filed: Feb. 11, 2010

(65) Prior Publication Data

US 2010/0210475 A1 Aug. 19, 2010

(30) Foreign Application Priority Data

Feb. 11, 2009 (KR) .......................... 10-2009-0011210

(51) Int. Cl.
*G01N 33/48* (2006.01)

(52) U.S. Cl. ........... 422/403; 422/62; 422/82.05; 506/9; 506/32

(58) Field of Classification Search .................. 422/403, 422/62, 82.05; 506/9, 32
See application file for complete search history.

(56) References Cited

U.S. PATENT DOCUMENTS

| 7,164,533 B2 * | 1/2007 | Moon et al. .................. 359/569 |
| 7,687,239 B2 * | 3/2010 | Goldberg et al. .............. 435/7.2 |
| 2008/0124719 A1 | 5/2008 | Chung et al. |

FOREIGN PATENT DOCUMENTS

| JP | 2003-156442 A | 5/2003 |
| JP | 2003-156495 A | 5/2003 |
| JP | 2005-070031 A | 3/2005 |
| JP | 2005-181181 A | 7/2005 |
| JP | 2005-195576 A | 7/2005 |
| JP | 2006-003354 A | 1/2006 |
| JP | 2006-275576 A | 10/2006 |

\* cited by examiner

*Primary Examiner* — Lyle Alexander
(74) *Attorney, Agent, or Firm* — Leydig, Voit & Mayer, Ltd.

(57) ABSTRACT

A substrate includes; a fiducial mark disposed on the substrate, an area on the substrate on which a probe material is configured to be immobilized, the area being separated from the fiducial mark, and a probe immobilization compound disposed on the area on the substrate on which the probe material is configured to be immobilized, wherein the fiducial mark has a structure which reflects irradiated light at a greater intensity than an intensity of reflected irradiated light form the area on the substrate not corresponding to the fiducial mark.

8 Claims, 4 Drawing Sheets

PATERNING OXIDE LAYER

FIG. 1C

IMMOBILIZING PROBE
IMMOBILIZATION COMPOUND
ON OXIDE LAYER

MICROARRAY HAVING BRIGHT FIDUCIAL MARK AND METHOD OF OBTAINING OPTICAL DATA FROM THE MICROARRAY

CROSS-REFERENCE TO RELATED APPLICATION

This application claims priority to Korean Patent Application No. 10-2009-0011210, filed on Feb. 11, 2009, and all the benefits accruing therefrom under 35 U.S.C. §119, the content of which in its entirety is incorporated herein by reference.

BACKGROUND

1. Field

One or more exemplary embodiments of the present invention relate to a substrate for a microarray having a bright fiducial mark when irradiated, a method of manufacturing the substrate, a microarray including the substrate, and a method of obtaining optical data from the microarray.

2. Description of the Related Art

Generally, in a typical microarray, probe materials that bind to a target material are immobilized to a plurality of distinct regions of a substrate. The microarray is used in analyzing many target materials by contacting a sample, possibly including the target material labeled with a fluorescent material, with the probe materials on the microarray, and measuring light obtained therefrom.

Since the regions (hereinafter also referred to as spots) of the microarray where probe materials are immobilized are generally arranged to have a high density on the microarray, the number of irradiated and detected spots used in one experiment may be thousands to tens of thousands; in other words, a single microarray may contain thousands, or more, of individual regions disposed thereon. Accordingly, a manipulator, which analyzes image data obtained from a result of analysis of the microarray, generates a map or pattern of locations of the spots, before calculating the brightness of each of the spots, e.g., due to fluorescence of the fluorescent material used to label the target material hybridized to the spot on the microarray, and local backgrounds before quantizing an image signal obtained from the microarray. A microarray map is a template used by detection software so as to efficiently search for a location of each spot in the pattern on the microarray. Accordingly, locations of each spot are to be efficiently determined from optical data obtained from the microarray having many spots.

Typical methods of determining a location of a spot include a method of manually determining a spot on an optical image based on known spot information and a method of using robotic spot placement equipment.

However, a method of easily finding and analyzing a location of each spot from optical data obtained from a microarray is still to be developed and would be beneficial.

SUMMARY

One or more exemplary embodiments of the present invention include a substrate for a microarray having a bright fiducial mark when the substrate is irradiated.

One or more exemplary embodiments of the present invention include a method of manufacturing a substrate for a microarray having a bright fiducial mark when the substrate is irradiated.

One or more exemplary embodiments of the present invention include a microarray having a bright fiducial mark when the microarray is irradiated.

One or more exemplary embodiments of the present invention include a method of obtaining optical data from a microarray.

One or more exemplary embodiments of the present invention include a substrate including; a fiducial mark disposed on the substrate and an area on the substrate on which a probe material is configured to be immobilized, the area being separated from the fiducial mark, and a probe immobilization compound disposed on the are on the substrate on which the probe material is configured to be immobilized, wherein the fiducial mark has a structure which reflects irradiated light at a greater intensity than an intensity of reflected irradiated light from the area on the substrate not corresponding to the fiducial mark.

One or more exemplary embodiments of the present invention include a microarray including; a fiducial mark disposed on a substrate, a plurality of areas disposed on the substrate and separated from the fiducial mark, a probe immobilization compound disposed on the plurality of separate areas on the substrate, and at least one probe immobilized on a portion of the probe immobilization compound disposed on the plurality of separate areas of the substrate, wherein the fiducial mark has a structure which reflects irradiated light at a greater intensity than an intensity of reflected irradiated light form an area not corresponding to the fiducial mark.

One or more exemplary embodiments of the present invention include a method of manufacturing a substrate, the method including; providing a substrate, disposing a first material layer on the substrate, disposing a photoresist layer on the first material layer, exposing the photoresist layer to a light through a mask, developing the photoresist layer, etching at least a portion of the first material layer that is not covered by the photoresist layer to form a fiducial mark, and removing the photoresist layer, wherein the fiducial mark has a structure which reflects irradiated light at a greater intensity than an intensity of reflected irradiated light from an area of the substrate on which the fiducial mark is not formed.

One or more exemplary embodiments of the present invention include a method of obtaining data from a microarray including a fiducial mark and a plurality of distinct regions to which probe materials are immobilized on a surface of a substrate, wherein the fiducial mark has a structure which reflects light irradiated thereto, the method including; contacting a sample including a target molecule labeled with a light emitting material with the microarray, irradiating light to the microarray, measuring a light reflected from the microarray to obtain a reflected light measurement, identifying a fiducial mark using the reflected light measurement, identifying a plurality of distinct regions to which probe materials are immobilized, based on the identified fiducial mark, irradiating excitation light to the microarray, measuring a light emitted from the light emitting material to obtain an emitted light measurement, identifying the fiducial mark and the plurality of distinct regions using the emitted light measurement by comparing the emitted light measurement with the reflected light measurement, and obtaining optical data from the identified plurality of distinct regions.

Additional aspects will be set forth in part in the description which follows and, in part, will be apparent from the description, or may be learned by practice of the presented exemplary embodiments.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

To achieve the above and/or other aspects, one or more exemplary embodiments may include a substrate for a microarray, the substrate including a fiducial mark, e.g., a reference mark, and an area to which a probe material is to be immobilized on a surface of the substrate, wherein the fiducial mark has a structure reflecting irradiated light, and a probe immobilization compound is immobilized to a surface of the area to which the probe material is to be immobilized.

As used herein, the term "fiducial mark" denotes an area used as a datum point while analyzing an optical signal, such as a fluorescent signal, obtained from a result of interacting a material, such as a probe material, immobilized on a spot of a microarray with a target material. In the substrate, the fiducial mark may provide bright reflected light, when light is irradiated thereto. The "bright reflected light" is bright enough to identify the fiducial mark based on the light, considering known information about a fiducial mark and other areas, e.g., in one exemplary embodiment the "bright reflected light" may have a luminosity greater than a surrounding area of the microarray substrate. In one exemplary embodiment, the bright reflected light may have a similar luminosity level as an area to which the probe material is immobilized. Alternative exemplary embodiments include configurations wherein the reflected light of the fiducial mark may be 1.1 times, 1.2 times, 1.3 times, 1.4 times, 1.5 times, 2 times, 3 times or more brighter than reflected light of other areas of the microarray. The information about a fiducial mark and other areas includes coordinate information about a location and an area used while manufacturing a microarray, e.g., the information about the fiducial mark may include positional information with respect to the microarray. In one exemplary embodiment, a surface of the fiducial mark may reflect the irradiated light without using another layer as a medium, e.g., no additional reflective surface is added onto the microarray to form the fiducial mark. In other words, exemplary embodiments include configurations wherein the surface of the fiducial mark may directly reflect the irradiated light.

Exemplary embodiments include configurations wherein a probe immobilization compound may be, or alternatively may not be, immobilized to the surface of the fiducial mark. Accordingly, the probe material may be, or alternatively may not be, immobilized to the surface of the fiducial mark.

The fiducial mark may reflect light irradiated thereto at a higher rate compared to an area to which the probe material is to be immobilized. In one exemplary embodiment, the fiducial mark may be formed of a material identical to a material of the distinct regions of the microarray, e.g., the regions of the microarray to which the probe material may be affixed. In one exemplary embodiment, the fiducial mark may have a layer structure identical to the distinct regions. In one exemplary embodiment, the fiducial mark may have a stacked structure of an oxidization layer on the substrate. Exemplary embodiments include configurations wherein the probe immobilization material may be, or alternatively may not be, immobilized to the oxidization layer of the fiducial mark.

In one exemplary embodiment, the fiducial mark may be defined via a patterning of the surface of the substrate. The patterning may be performed using well-known methods. In one exemplary embodiment, the patterning may be performed via photolithography. After the patterning process, the fiducial mark may have a pillar structure formed by etching and removing a surface of the substrate around the fiducial mark. Exemplary embodiments of a shape of the pillar viewed from above, i.e., a top plan shape of the pillar, may be circular or tetragonal including a rectangle or a square, however the shape of the fiducial mark is not limited thereto. In one exemplary embodiment, a corner of the plane shape of the pillar may reflect light, as will be discussed in more detail with respect to FIGS. 2A and 2B. Exemplary embodiments include configurations wherein the corner may be angled or rounded. Such a shape of the pillar may be naturally formed while etching the pillar and may reflect light therefrom. Generally, when the substrate is etched, a corner of the substrate that is being etched is angled instead of being square due to diffusion or other similar processes. Such an angled corner may be used as a reflective surface. However, one or more exemplary embodiments are not limited thereto. Exemplary embodiments include configurations wherein the etching may be dry etching or wet etching.

In one exemplary embodiment, the fiducial mark may include at least two pillars. A distance between the two pillars may be smaller than a resolution of a light receiving device used to measure light reflected from the pillars, e.g., a diameter of a pixel of the light receiving device. In one exemplary embodiment, a width dimension of a section of the pillar may be in a range of about 0.001 μm to about 10 μm. In one exemplary embodiment, the distance between the pillars may be in a range of about 0.001 μm to about 10 μm. In one exemplary embodiment, the height of the pillars may be in a range of about 0.001 μm to about 10000 μm. As seen from a top plan view, a plane shape of the fiducial mark, e.g., a plane shape of the at least two pillars, may be arranged within a range of a shape substantially identical to a shape of a probe spot to be immobilized to the substrate, e.g., as seen from a top plan view, the fiducial mark and the probe spot may have the same shape and size and may be aligned with one another. In one exemplary embodiment, the fiducial mark may be formed by arranging a plurality of pillars within a range of a shape substantially identical to a shape of a probe spot to be immobilized to the substrate, as seen from a top plan view, wherein a dimension of a section of the pillar is in a range of about 0.001 μm to about 10 μm, a distance between the pillars is in a range of about 0.001 μm to about 10 μm, and the height of the pillar is in a range of about 0.001 μm to about 10000 μm.

Light may be irradiated by a light source at an angle for detecting interaction between a target material and a probe on a probe spot. In one exemplary embodiment, the light may be irradiated at an angle larger than about 0° and smaller than about 90° with respect to a surface of the substrate, and may be irradiated with respect to a circumference of a spot in a range of about 0.0001° to about 89.9999°. Exemplary embodiments include configurations wherein the irradiated light may be light in which all light wavelengths are mixed, or excitation light of a predetermined wavelength corresponding to a fluorescent material.

The fiducial mark may be arranged in any shape on the microarray. The fiducial mark may be arranged in a shape distinguished from a shape of the spot on the microarray. The fiducial mark may be arranged in a sign such as a cross, or a character such as T on the microarray.

A "microarray" as used herein has a meaning well known to one of ordinary skill in the art. The microarray includes a certain material, such as a probe material, which has an increased binding affinity for a target material, immobilized to a plurality of distinct regions on a substrate. In the microarray, the distinct regions are also referred to as spots, and generally, at least two regions are arranged on the substrate with an interval separating them or without an interval separating them. Exemplary embodiments of the probe material may include a biomaterial, such as deoxyribonucleic acid ("DNA"), ribonucleic acid ("RNA"), complementary DNA ("cDNA"), messenger RNA ("mRNA"), protein, sugar or other similar materials. Exemplary embodiments of the substrate may be formed of glass, silicon, plastic, ceramic, quartz or other materials with similar characteristics.

Exemplary embodiments of the substrate may include a first material layer wherein the first material layer may be formed of an organic or an inorganic material. In one particular exemplary embodiment, the first material layer may be an oxide layer. The first material layer may be formed naturally or artificially on the substrate. When the first material layer is an oxide layer, the oxide layer may be a silicon dioxide layer that is naturally formed on silicon as the silicon is exposed to oxygen in air, or may be formed by stacking an oxide layer on the substrate. The first material layer, such as an oxide layer, may have a thickness that generates constructive interference at a wavelength of excitation light used to measure fluorescent light. The thickness that generates constructive interference may differ according to a wavelength of the irradiated light, e.g., the thickness of the first material layer may be predetermined to generate constructive interference of the excitation light. The fiducial mark may be formed by etching the first material layer, such as an oxide layer. A refraction index of the first material layer such as an oxide layer may be smaller than a refraction index of the substrate. Exemplary embodiments of the first material layer include a silicon dioxide layer and a silicon nitride layer.

A probe immobilization compound may be immobilized on a surface of the substrate. In one exemplary embodiment the surface of the substrate may be a surface excluding a surface of the fiducial mark. The probe immobilization compound may be at least one compound selected from the compound having biotin, avidin, streptavidin, poly L-lysine, an amino group, an aldehyde group, a thiol group, a carbonyl group, a succinimide group, a maleimide group, an epoxide group, and an isothiocyanate group. Examples of the compound having an amino group include 3-aminopropyltrimethoxysilane, N-(2-aminoethyl)-3-aminopropyltrimethoxysilane ("EDA"), trimethoxysilylpropyldiethylenetriamine ("DETA"), 3-(2-aminoethylaminopropyl) trimethoxysilane, 3-aminopropyltriethoxysilane, and examples of the compound having an aldehyde group include glutaraldehyde and other similar materials. Examples of the compound having a thiol group include 4-mercaptopropyltrimethoxysilane ("MPTS"). Also, examples of the compound having an epoxide group include 3-glycidoxypropyltrimethoxysilane, examples of the compound having an isothiocyanate group include 4-phenylenediisothiocyanate ("PDITC"), and examples of the compounds having a succinimide and maleimide group include disuccinimidyl carbonate ("DSC") and succinimidyl 4-(maleimidephenyl) butyrate ("SMPB").

The substrate may further include an alignment marker, which is a marker that enables the substrate to be easily and reliably placed on a uniform location with respect to a probe material immobilization device. By using the alignment marker, the substrate may be easily and reliably placed on a uniform location with respect to the probe material immobilization device, and thus a location of a probe spot, i.e., a coordinate, of a probe material immobilized on the substrate becomes objective and repeatable. The coordinate may be given based on a certain location of the substrate immobilized by the alignment marker. A location of the probe spot may be identified using rectangular coordinates with respect to a y axis and an x axis based on the alignment marker as a reference.

The alignment marker may have a patterned shape via photolithography. In one exemplary embodiment, the alignment marker may be patterned in such a way that a sign, such as a cross, or a character, such as T, is formed on the substrate.

One or more exemplary embodiments may include a microarray including a probe immobilized on a plurality of distinct regions in the area to which the probe material is to be immobilized on the surface of the substrate mentioned above.

As described above, exemplary embodiments of the probe material may include a biomaterial, such as DNA, RNA, cDNA, mRNA, protein, sugar or other similar substances. Exemplary embodiments include configurations wherein the distinct regions may have a shape substantially identical to the fiducial mark as seen from a top plan view.

One or more exemplary embodiments of the present invention include a method of manufacturing the substrate mentioned above, the method including: providing a substrate including a first material layer on a surface of the substrate; forming a photoresist layer on the first material layer; exposing the photoresist layer through a mask; to a light; developing the photoresist layer; etching a part of the first material layer that is not protected by the photoresist layer to form the fiducial mark; and removing the photoresist layer.

The method includes providing a first material layer on a surface of a substrate. Exemplary embodiments include configurations wherein the first material layer may be formed of an organic or an inorganic material. In one exemplary embodiment, the first material layer may be an oxide layer. Exemplary embodiments include configurations wherein the first material layer may be formed naturally or artificially. In the exemplary embodiment wherein the first material layer is an oxide layer, the oxide layer may be a silicon dioxide layer that is naturally formed on silicon as the silicon is exposed to the air, or may be formed by stacking an oxide on the substrate. Alternative exemplary embodiments include configurations wherein the first material layer may be formed by stacking a first material on the substrate. The first material layer may be formed by coating silicon dioxide or silicon nitride on the substrate, such as a silicon substrate, via well-known methods. Exemplary embodiments include configurations wherein the coating may be performed via spin coating or chemical vapour deposition ("CVD") or other similar processes. The first material layer may have a thickness that generates constructive interference between light reflected from the substrate and light reflected from a surface of the first material layer, when the substrate is irradiated as described in detail above. The substrate may be irradiated with excitation light having a wavelength used to measure fluorescent light. The thickness of the first material layer that generates constructive interference may differ according to a wavelength of the irradiated light. In one exemplary embodiment, a refraction index of the first material layer, such as an oxide layer, may be smaller than a refraction index of the substrate.

The method also includes forming a photoresist layer on the first material layer. The photoresist layer may be formed by using any well-known method. In one exemplary embodiment, a photoresist may be coated on the substrate via spin coating, and then, the photoresist layer may be formed by heating and hardening the photoresist coated on the substrate. Exemplary embodiments of the type of the photoresist are not limited to a coating method and a hardening condition, and may be a positive or negative type.

The method includes exposing the photoresist layer through a mask to a light. Based on whether the photoresist is a positive type or a negative type, the mask is prepared in such a way that the fiducial mark is formed in a desired method, shape, and interval, and the photoresist layer is exposed through the mask to the light. An exposing condition may be based on the photoresist. A blueprint for forming a structure of at least two pillars may be defined based on the mask. Also, a blueprint of an alignment marker may be defined on the mask. The alignment marker may be formed via a patterning process substantially identical to the fiducial mark. In one exemplary embodiment, the alignment marker may be simultaneously formed according to the same process as the forming of the fiducial mark.

The method also includes developing the photoresist layer. The developing of the photoresist layer may be performed by processing the photoresist layer with a developer, and then, optionally cleaning the photoresist layer. The developer may be selected based on the photoresist.

The method also includes forming the fiducial mark by etching a part of the first material layer that is not protected by the photoresist layer. The first material layer, exemplary embodiments of which include an oxide layer, may be etched via any well-known method. Exemplary embodiments include configurations wherein the first material layer may be etched via dry etching or wet etching. The first material layer may be etched using an etchant that etches an oxide layer. Thus, the fiducial mark having the structure of at least two pillars may be formed via such etching.

The method also includes removing the photoresist layer. The photoresist layer may be removed via any well-known method. Exemplary embodiments include configurations wherein the photoresist layer may be removed using an organic solvent, such as acetone, that dissolves the photoresist.

Exemplary embodiments of the method may further include forming a probe immobilization layer on the first material layer, before the forming of the photoresist layer and after the providing of the substrate, or after the removing of the photoresist layer. The probe immobilization layer may be formed by immobilizing a probe immobilization compound on the first material layer, exemplary embodiments of which include an oxide layer. The probe immobilization compound is chosen as described above for the substrate of a microarray. In the exemplary embodiment wherein the probe immobilization compound is biotin, the probe immobilization layer may be formed by reacting the first material layer, such as an oxide layer, that is processed with aminosilane with biotin succinimidyl ester. When the probe immobilization compound is glutaraldehyde having an aldehyde group, the probe immobilization layer may be formed by reacting the first material layer that is processed with aminosilane with glutaraldehyde.

One or more exemplary embodiments of the present invention include a method of obtaining data from a microarray including a fiducial mark and a plurality of distinct regions to which probe materials are immobilized on a surface of a substrate, wherein the fiducial mark has a structure reflecting irradiated light, the method including: contacting a sample, which possibly includes a target molecule labeled with a light emitting material, to the microarray; irradiating light to the contacted microarray and measuring reflected light from the microarray; identifying a fiducial mark from data of the reflected light; identifying a plurality of distinct regions to which probe materials are immobilized, based on the identified fiducial mark; irradiating light to the contacted microarray and measuring an emitted light from the light emitting material; identifying the fiducial mark and the plurality of distinct regions from data of the emitted light, by comparing the data of the emitted light with the data of the reflected light; and obtaining optical data from the identified plurality of distinct regions.

The method includes contacting a sample, which possibly includes a target molecule labeled with a light emitting material, to a microarray including a fiducial mark and a plurality of distinct regions to which probe materials are immobilized on a surface of a substrate, wherein the fiducial mark has a structure reflecting light irradiated thereto.

The microarray has been described above. As described above, the probe material and/or the target material may be DNA, RNA, cDNA, mRNA, protein or other similar material. The light emitting material, exemplary embodiments of which include a fluorescent material, may be labelled on the target material via any well-known method. The sample may contact the microarray via any well-known method. For example, in one exemplary embodiment a DNA probe and target DNA may be hybridized by mixing fluorescent material-labelled target DNA with a hybridization buffer, denaturalizing the target DNA by heating the resultant mixture, adding the resultant solution to the microarray, covering the microarray, and then maintaining the microarray at a suitable temperature that does not dry the microarray, so as to form a hybrid molecule between the DNA probe and the target DNA. Then, the microarray may be washed using a solution having a controlled salt concentration and temperature to remove the unbound target DNA and nonspecifically bound materials from the microarray, thereby leaving the hybridization-bound DNA probe and target DNA.

The method also includes irradiating light to the contacted microarray and measuring reflected light from the microarray. Exemplary embodiments include configurations wherein the irradiated light may be a laser beam. The reflected light may be measured using a light receiving device. Exemplary embodiments of the light receiving device include a photomultiplier, a photodiode, a charge-coupled device ("CCD") and other similar materials. A light-receiving device suitable for receiving a fluorescent light generated by the excitation of a fluorescent material may be used to measure the reflected light as well as the fluorescent light. In one exemplary embodiment, the light-receiving device suitable for receiving a fluorescent light generated by the excitation of a fluorescent material may be used to simultaneously measure the reflected light as well as the fluorescent light. In one exemplary embodiment, the reflected light and the fluorescent light may be resolved using a dichroic mirror, and a light receiving device for measuring fluorescent light may be installed separately from a light receiving device for measuring reflected light. Exemplary embodiments of the light receiving device for measuring fluorescent light include a photomultiplier, a photodiode, a CCD or other similar devices. The measured light may be in an image form or a digitalized form in which the intensity of the reflected light or fluorescent light is expressed numerically. The light irradiated to the substrate, for example, white light, may be irradiated at an angle larger than about 0° and smaller than about 90°, for example, in a range of about 0.0001° to about 89.9999°, with respect to a surface of the substrate. In one exemplary embodiment, the reflected light may be measured at almost about 90°, for example, at an angle of about 89° to about 90° with respect to the surface of the substrate.

The method also includes identifying a fiducial mark from data of the reflected light. Since the fiducial mark may reflect light at a higher rate compared to other areas of the substrate of the microarray, the fiducial mark may provide a reflected light with a higher intensity to the light receiving device. Accordingly, the fiducial mark may be bright in the data of the reflected light, in the exemplary embodiment wherein the data is shown in an image. By determining a portion indicating high light intensity, e.g. a bright portion, from the data of the reflected light, the fiducial mark may be identified. Information about the fiducial mark includes a location and a range of the fiducial mark. Also, the fiducial mark may be identified using known information about the fiducial mark, areas to which the probe materials are immobilized, and the alignment marker. The known information may include relative locations, i.e. coordinates, of the fiducial mark used while manufacturing the microarray, the areas to which the probe materials are immobilized, and the alignment marker. Also, the identified fiducial mark may be used as it is, if an arranged shape of the identified fiducial mark is substantially identical to that of the known fiducial mark, and may be revised by adjusting an orientation of the microarray, if the arranged shape of the identified fiducial mark is different from that of the known fiducial mark.

The method also includes identifying a plurality of distinct regions to which probe materials are immobilized, based on the identified fiducial mark. The distinct regions may be identified by referring to known information about the fiducial mark, the areas to which the probe materials are immobilized, and the alignment marker. The known information may include relative locations, e.g. coordinates, of the fiducial mark used while manufacturing a microarray, the areas to which the probe materials are immobilized, and the alignment marker.

The method also includes irradiating light to the contacted microarray and measuring an emitted light from the light emitting material. The irradiated light may be selected according to a type of a light emitting material used, such as a fluorescent material. Exemplary embodiments of a light receiving device for measuring light include a photomultiplier, a photodiode, and a CCD. The measured light may have an image form or a digitalized form in which the fluorescent intensity is expressed numerically. The irradiated light, for example excitation light applied to a fluorescent material, may be irradiated at an angle larger than about 0° and smaller than about 90° with respect to a surface of the substrate. The emitted light may be measured at an angle approximately perpendicular, for example about 89° to about 90°, to the surface of the substrate. In another exemplary embodiment, the emitted light may be measured at an angle in a range of about 45° to about 135° with respect to the surface of the substrate. When a probe material is not immobilized to a surface of the fiducial mark, the fiducial mark does not emit light even when irradiated with the excitation light, and thus data of the emitted light from the fiducial mark may be a dark portion with respect to other areas of the substrate surface. In other words, the fiducial mark may be identified based on the dark portion.

The method also includes identifying the fiducial mark and the plurality of distinct regions from the data of the emitted light, by comparing the data of the emitted light with the data of the reflected light. Since the data of the reflected light and the data of the emitted light are measured from the same microarray, locations of the distinct regions in the data of the emitted light correspond to locations of the distinct regions in the data of the reflected light. The distinct regions may be identified by identifying information obtained from the data of the reflected light correspondingly to the data of the emitted light. The identifying information may be correspondingly identified by checking digitalized coordinates or by virtually overlapping an image of the data of the reflected light and an image of the data of the emitted light.

The method also includes obtaining optical data from the identified plurality of distinct regions. The optical data may include an integral value, an average value, or a median value of the fluorescent light in a spot area. In one exemplary embodiment, the optical data about each spot on the microarray may be sequentially obtained.

In an exemplary embodiment of the method, the measuring of the reflected light and the measuring of the emitted light may be simultaneously performed.

Reference will now be made in detail to exemplary embodiments, examples of which are illustrated in the accompanying drawings.

Figure 1A:
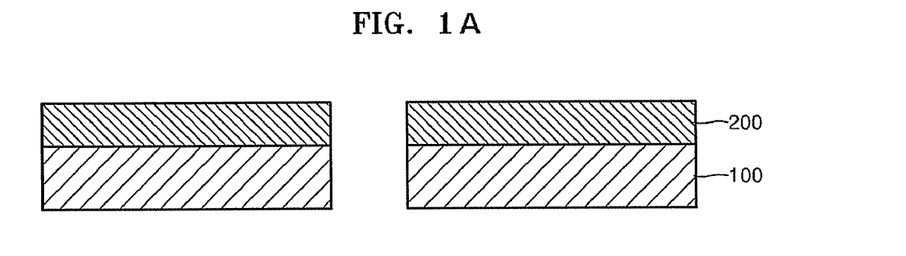
FIGS. 1A-C are diagrams illustrating an exemplary embodiment of a fiducial mark having a structure of at least one pillar, and describing an exemplary embodiment of a method of manufacturing the exemplary embodiment of a fiducial mark.
Figure 1B:
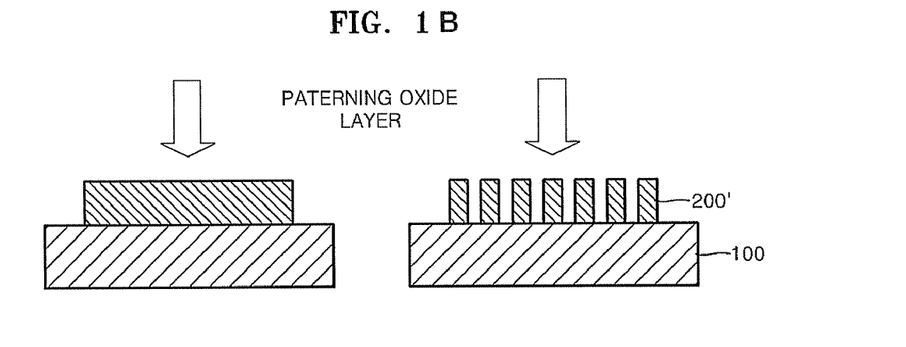
Figure 1C:
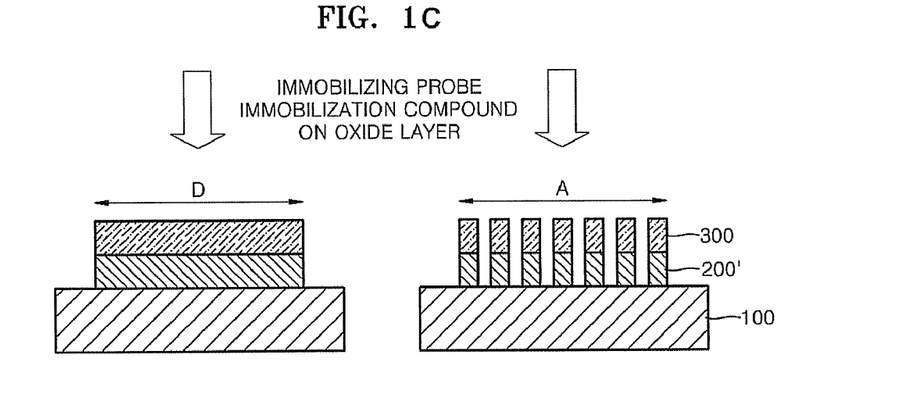

FIGS. 1A-C are diagrams illustrating a bright fiducial mark A having a structure of at least one pillar, and for describing an exemplary embodiment of a method of manufacturing the bright fiducial mark A. Referring to FIGS. 1A-C, the bright fiducial mark A including a structure of at least one pillar 200' is manufactured according to substantially the same process as manufacturing an area D to which a probe is immobilized. In other words, a mask used during a patterning process not only includes a pattern for forming the area D, but also includes a pattern for forming the bright fiducial mark A and/or a dark fiducial mark (not shown). In FIG. 1C, a probe immobilization compound 300 is immobilized on the bright fiducial mark A, however alternative exemplary embodiments include configurations wherein the probe immobilization compound 300 may not be immobilized on the bright fiducial mark A. The probe may be or may not be immobilized with the probe immobilization compound 300 on the bright fiducial mark A. In FIG. 1, a first material layer 200 coated on the substrate 100 is an oxide layer, however the first material layer 200 may be any layer that reflects irradiated light. In one exemplary embodiment, the substrate 100 may be a silicon material and the first material layer 200 may be a silicon dioxide.

Figure 2A:
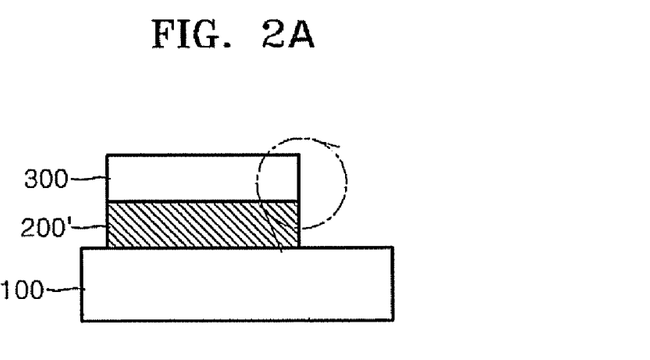
FIG. 2A is a diagram illustrating an exemplary embodiment of a pillar and FIG. 2B is an enlarged diagram of a corner of the exemplary embodiment of a pillar.
Figure 2B:
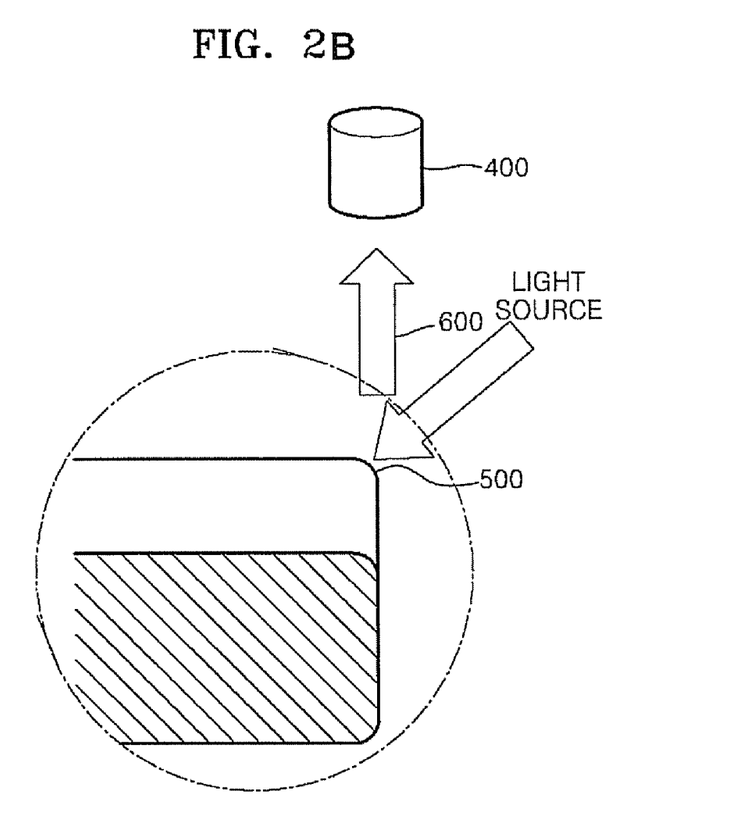

FIG. 2B is an enlarged diagram of a corner of a pillar 200' of FIG. 2A. As shown in FIG. 2B, the corner manufactured via patterning is angled or rounded so that light is reflected in terms of a dimension of a light wavelength. In other words, the corner may provide a reflection surface 500. When a light is irradiated from a light source at a suitable angle with respect to the surface of the substrate 100, the corner 500 reflects the irradiated light and then the reflected light 600 is measured by a light receiving device 400. The light from the light source may be irradiated for example, at an angle larger than about 0° and smaller than about 90° with respect to the surface of the substrate, and may be irradiated with respect to a circumference of a spot in a range of about 0.0001° to about 89.9999°. The emitted light may be measured at an angle approximately perpendicular, for example about 89° to about 90°, with respect to the surface of the substrate 100. Alternative exemplary embodiments include configurations wherein the emitted light may be measured at an angle from about 45° to about 135° with respect to the substrate 100. Exemplary embodiments of the light receiving device 400 for measuring fluorescent light include a photomultiplier, a photodiode, and a CCD.

Figure 3A:
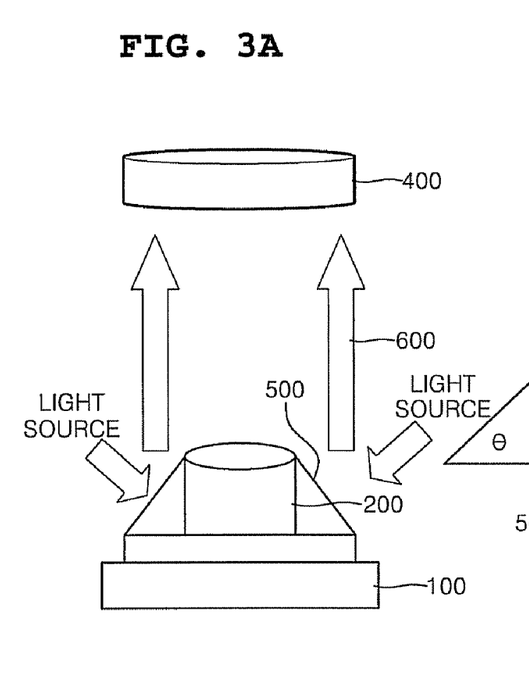
FIGS. 3A and 3B are diagrams schematically illustrating a mechanism of using a pillar structure as a fiducial mark.
Figure 3B:
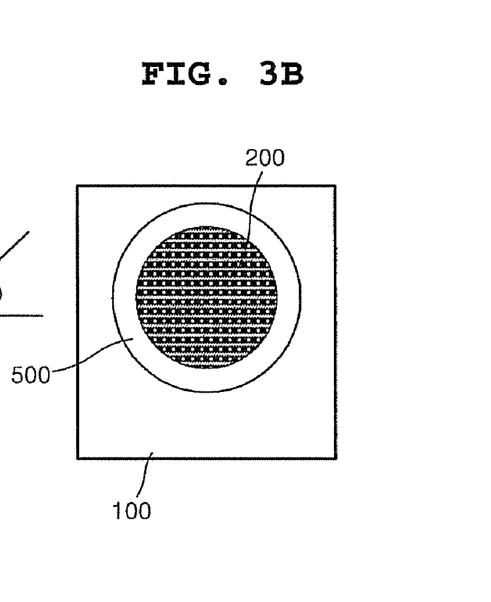

FIGS. 3A and 3B are diagrams schematically illustrating a mechanism of using a pillar as a bright fiducial mark. As shown in FIGS. 3A and 3B, when light is irradiated on a circumference of the pillar at an angle θ with respect to a horizontal surface of the pillar, a corner of the pillar operates as a reflective surface 500, so as to generate reflected light 600. The reflected light 600 may be measured by the light receiving device 400 such as a camera. Since the reflected light 600 is stronger than fluorescent light, a strong light may be measured even when an optical measuring device is exposed to the reflected light 600 for a short period of time. In one exemplary embodiment, the intensity of the measured reflected light 600 is generally about 1,000 times to about 10,000 times larger than the intensity of fluorescent light. The reflected light 600 may be measured without using an optical filter. FIG. 3B shows a top plan view of a bright fiducial mark having a structure of at least two pillars 200', wherein the top plan view image is obtained by measuring the reflected light 600 from an upper portion of the bright fiducial mark, that is about 89° to about 90°, with respect to the surface of the substrate 100. As shown in FIG. 3B, the intensity of the measured light is strong in an area of a substrate 100, the reflective surface 500, i.e. the corner of the pillar 200', and an inner part 200 of the plane shape of the pillar 200'.

Figure 4A:
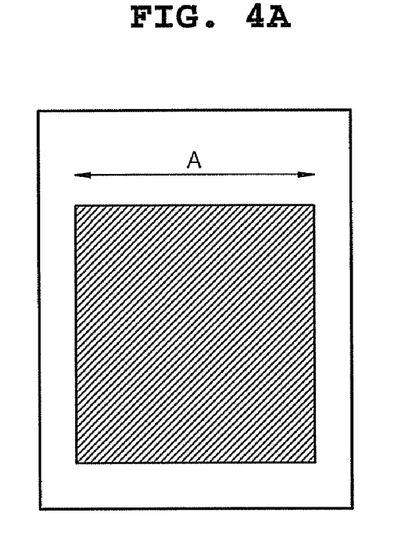
FIGS. 4A-D are diagrams of reflected light images and fluorescent light images measured from the same structure.
Figure 4B:
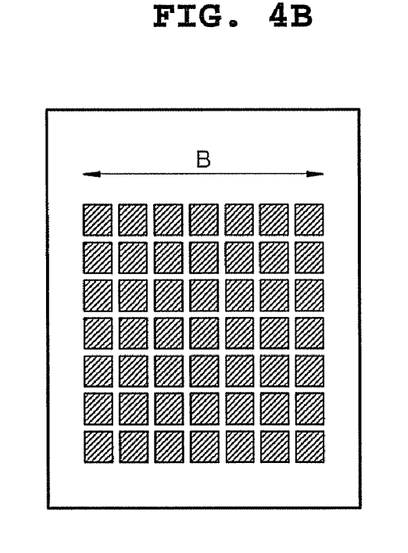
Figure 4C:
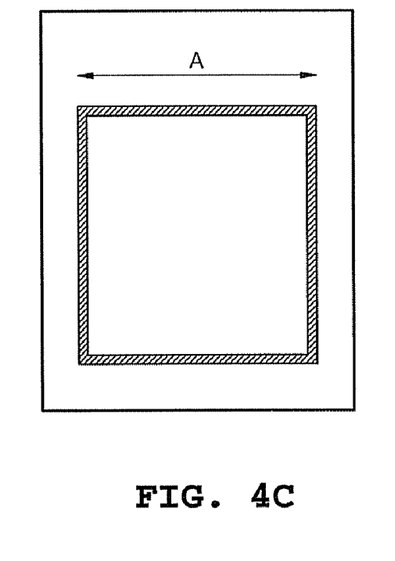
Figure 4D:
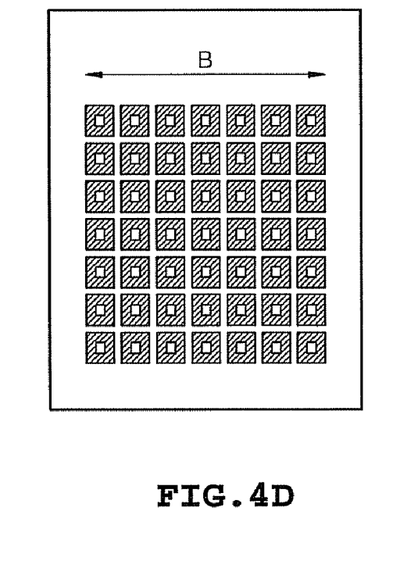

FIGS. 4A-D are diagrams of a reflected light image and a fluorescent light image measured from the same structure. FIGS. 4A and B are fluorescent images obtained by measuring a fluorescent light by irradiating light on areas A and B (illustrated by arrows labeled A and B), when light emitting dyes, e.g. materials labeled with a fluorescent dyes, are immobilized to the areas A and B. As shown in the upper diagrams, the fluorescent light is evenly distributed on the entire surface of the structure as seen from a top plan view. FIGS. 4C and D are images obtained by irradiating light on circumferences of the areas A and B at about 45° with respect to a horizontal surface of the pillar and then measuring reflected light from upper portions of the areas A and B. As shown in the lower diagrams, strong light is measured from corners of the plane shape of the structure in images of the areas A and B. In FIGS. 4C and D, the areas A and B show a bright fiducial mark having a structure respectively of one pillar and a plurality of pillars.

A substrate for a microarray, according to an exemplary embodiment of the present invention, may be used to manufacture a microarray having a bright fiducial mark when irradiated.

A method of manufacturing a substrate for a microarray, according to an exemplary embodiment of the present invention, may provide a microarray having a bright fiducial mark when irradiated.

A microarray according to an exemplary embodiment of the present invention has a bright fiducial mark when irradiated.

A method of obtaining optical data from a microarray, according to an exemplary embodiment of the present invention, may efficiently obtain optical data from the microarray.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

What is claimed is:

1. A substrate comprising:
   a plurality of distinct fiducial marks disposed on a surface of the substrate;
   a plurality of distinct areas on the surface of the substrate on which a probe material is configured to be immobilized, each of the areas being separated from the fiducial marks and from each other; and
   a probe immobilization compound disposed on at least one of the areas on the surface of the substrate on which the probe material is configured to be immobilized,
   wherein each fiducial mark has a structure which reflects irradiated light at a greater intensity than an intensity of reflected irradiated light from areas on the substrate not corresponding to the fiducial mark;
   wherein each fiducial mark comprises at least two pillars and is separated from the areas on the surface of the substrate on which a probe material is configured to be immobilized; and
   wherein a distance between the at least two pillars is from about 0.001 μm to about 10000 μm.

2. The substrate of claim 1, wherein a distance between the at least two pillars is smaller than a resolution distance of a light receiving device which receives reflected irradiated light from the fiducial marks.

3. The substrate of claim 1, wherein a width of each of the at least two pillars is in a range of about 0.001 μm to about 10 μm.

4. The substrate of claim 1, wherein a height of the at least two pillars is from about 0.001 μm to about 10000 μm.

5. The substrate of claim 1, wherein a surface of each of the fiducial marks directly reflects the irradiated light therefrom.

6. The substrate of claim 1, wherein the irradiated light is irradiated at an angle that is larger than about 0° and smaller than about 90° with respect to the surface of the substrate.

7. A microarray comprising:
   a plurality of distinct fiducial marks disposed on a surface of a substrate;
   a plurality of distinct areas disposed on the surface of the substrate and separated from the fiducial marks;
   a probe immobilization compound disposed on the plurality of distinct areas on the surface of the substrate; and
   at least one probe immobilized on a portion of the probe immobilization compound disposed on the plurality of distinct areas on the surface of the substrate;
   wherein each fiducial mark has a structure which reflects irradiated light at a greater intensity than an intensity of reflected irradiated light from an area not corresponding to the fiducial mark;
   wherein each fiducial mark comprises at least two pillars and is separated from the distinct areas on the surface of the substrate on which a probe material is configured to be immobilized; and
   wherein a distance between the at least two pillars is from about 0.001 μm to about 10000 μm.

8. An apparatus for obtaining data from a microarray, wherein the apparatus comprises:
   a microarray comprising:
      a fiducial mark disposed on a surface of a substrate;
      a plurality of areas disposed on the surface of the substrate and separated from the fiducial mark;
      a probe immobilization compound disposed on the plurality of separate areas on the surface of the substrate; and
      at least one probe immobilized on a portion of the probe immobilization compound;
      wherein the fiducial mark has a structure which reflects irradiated light at a greater intensity than an intensity of reflected irradiated light from an area not corresponding to the fiducial mark; and
      wherein the fiducial mark comprises at least two pillars, a distance between the at least two pillars is from about 0.001 μm to about 10000 μm;
   a light source for irradiating the surface of the substrate; and
   a light receiving device for measuring a reflected light from the irradiated surface and determining positional information about the fiducial mark with respect to the microarray.

* * * * *